United States Patent
Su

(10) Patent No.: US 7,234,046 B2
(45) Date of Patent: Jun. 19, 2007

(54) BRANCH PREDICTION USING PRECEDENT INSTRUCTION ADDRESS OF RELATIVE OFFSET DETERMINED BASED ON BRANCH TYPE AND ENABLING SKIPPING

(75) Inventor: Hong-Men Su, Sindian (TW)

(73) Assignee: Faraday Technology Corp., Hsin-Chu (TW)

( * ) Notice: Subject to any disclaimer, the term of this patent is extended or adjusted under 35 U.S.C. 154(b) by 66 days.

(21) Appl. No.: 11/002,393

(22) Filed: Dec. 1, 2004

(65) Prior Publication Data

US 2006/0149947 A1 Jul. 6, 2006

(51) Int. Cl.
 *G06F 9/38* (2006.01)
(52) U.S. Cl. .................. 712/239; 712/237; 712/240
(58) Field of Classification Search ...................... None
 See application file for complete search history.

(56) References Cited

U.S. PATENT DOCUMENTS

| | | | | |
|---|---|---|---|---|
| 5,237,666 A | * | 8/1993 | Suzuki et al. .............. 712/240 |
| 5,692,167 A | * | 11/1997 | Grochowski et al. ........ 712/226 |
| 5,748,976 A | * | 5/1998 | Taylor .......................... 712/240 |
| 5,848,269 A | * | 12/1998 | Hara ............................ 712/239 |
| 5,996,071 A | * | 11/1999 | White et al. ................. 712/238 |
| 6,609,194 B1 | * | 8/2003 | Henry et al. ................. 712/238 |
| 6,622,240 B1 | | 9/2003 | Olson et al. ................. 712/233 |

* cited by examiner

*Primary Examiner*—Kenneth S. Kim
(74) *Attorney, Agent, or Firm*—Winston Hsu

(57) ABSTRACT

A method of predicting and skipping branch instructions for pipelines which need more than one cycle to predict branch direction and branch target addresses in microprocessors and digital signal processors is provided. The address of an instruction executed before the predicted branch is used as an index to enable early branch prediction so that the address of the instruction predicted to be executed immediately after the branch is available earlier, thereby reducing the number of idle or wasted clock cycles. The relative offset in the execution sequence between the previously executed instruction and the predicted branch instruction is determined based on the type of the predicted branch instruction and the cycles required to predict branch execution.

7 Claims, 7 Drawing Sheets

Without branch prediction

| Cycle | F1 | D2 | E3 | M4 | W5 |
|---|---|---|---|---|---|
| 1: | i1 | | | | |
| 2: | i2 | i1 | | | |
| 3: | i3 | i2 | i1 | | |
| 4: | BC4 | i3 | i2 | i1 | |
| 5: | -- | BC4 | i3 | i2 | i1 |
| 6: | -- | -- | BC4 | i3 | i2 |
| 7: | T5 | -- | -- | BC4 | i3 |
| 8: | T6 | T5 | -- | -- | BC4 |

FIG. 2 (PRIOR ART)

With branch prediction

| Cycle | F1 | D2 | E3 | M4 | W5 |
|---|---|---|---|---|---|
| 1: | i1 | | | | |
| 2: | i2 | i1 | | | |
| 3: | i3 | i2 | i1 | | |
| 4: | BC4 | i3 | i2 | i1 | |
| 5: | T5 | BC4 | i3 | i2 | i1 |
| 6: | T6 | T5 | BC4 | i3 | i2 |

FIG. 3 (PRIOR ART)

|  | Without branch prediction | | | | | | |
|---|---|---|---|---|---|---|---|
| | F1 | F2 | D3 | R4 | E5 | M6 | W7 |
| Cycle 1: | i1 | | | | | | |
| 2: | i2 | i1 | | | | | |
| 3: | i3 | i2 | i1 | | | | |
| 4: | BC4 | i3 | i2 | i1 | | | |
| 5: | i5 | BC4 | i3 | i2 | i1 | | |
| 6: | T9 | XX | BC4 | i3 | i2 | i1 | |
| 7: | -- | T9 | XX | BC4 | i3 | i2 | i1 |
| 8: | -- | -- | T9 | XX | BC4 | i3 | i2 |

|  | F1 | F2 | D3 | R4 | E5 | M6 | W7 |
|---|---|---|---|---|---|---|---|
| Cycle 1: | i1 | | | | | | |
| 2: | i2 | i1 | | | | | |
| 3: | i3 | i2 | i1 | | | | |
| 4: | BC4 | i3 | i2 | i1 | | | |
| 5: | T9 | BC4 | i3 | i2 | i1 | | |

FIG. 7

|        | F1 | F2 | D3 | R4 | E5 | M6 | W7 |
|--------|----|----|----|----|----|----|----|
| Cycle 1: | i1 |    |    |    |    |    |    |
| 2:     | i2 | i1 |    |    |    |    |    |
| 3:     | i3 | *i2* | i1 |   |    |    |    |
| 4:     | B4 | i3 | i2 | i1 |    |    |    |
| 5:     | T9 | i3 | i2 | i1 |    |    |    |
| 6:     | Ta | T9 | i3 | i2 | i1 |    |    |
| 7:     | Tb | Ta | T9 | i3 | i2 | i1 |    |
| 8:     | Tc | Tb | Ta | T9 | i3 | i2 | i1 |

FIG. 9

BRANCH PREDICTION USING PRECEDENT INSTRUCTION ADDRESS OF RELATIVE OFFSET DETERMINED BASED ON BRANCH TYPE AND ENABLING SKIPPING

BACKGROUND OF THE INVENTION

1. Field of the Invention

The present invention relates to a method of predicting the target address of the branch instruction and a method of skipping some specific branch instruction for pipelines that need more than one cycle to predict branch target addresses in microprocessors and digital signal processors.

2. Description of Related Art

A configuration of multi-stage pipeline is commonly used in microprocessor and digital signal processor for executing instructions now. The pipeline comprises the stages of fetching, decoding and executing. In order to improve efficiency of execution, all stages in the pipeline are processed simultaneously. In other words, instead of starting to process the second instruction only after the first instruction has left the pipeline, while the third stage is processing the first instruction, the second stage is also processing the second instruction and the first stage is processing the third instruction simultaneously. In such case, most of the stages are idle and a big resource is wasted.

Such pipeline design runs well in the case where the instructions are sequentially executed. However, it would be a big issue when such design is applied to process the branch instructions. Once the branch instruction is taken and the program counter is jump to somewhere, it is required to flush the result of several front stages in the pipeline, such that the instruction on the branch target address can be processed. In other words, a couple of consecutive cycles are wasted in this case.

In order to reduce the waste, a technique of predicting the target address of the branch instruction has been developed accordingly, it is referred to as "branch prediction". The object of the branch prediction is to predict the target address and the direction of the branch instruction in its earliest stage as possible as it can, wherein the direction means either "taken" or "not taken" of the branch instruction. Therefore, in case the prediction result indicates "taken of the branch instruction", namely the process jumps to elsewhere, the pipeline can extract the instruction on the branch target address earlier. In subsequent stages executed by the pipeline, if it is determined that the predicted target address is a correct one, the result of the previous stages is reserved. Therefore, cycles are not wasted and it is possible to process multiple stages at the same time.

FIG. 1 is a schematic diagram illustrating a design of a conventional branch prediction technique, wherein each instruction is a constant of 4 bytes long. In the pipeline fetch stage, the value of the program counter (PC) 101 is provided to an instruction cache 102 for fetching a current instruction and a prediction unit 104 for creating indices, which are then used for searching the previously recorded related information. If the related information exist, which indicates the current instruction is a branch instruction, the prediction unit 104 predicts and provides a direction 106 and a target address 105 of the branch instruction to a multiplexer 107. Meanwhile, an adder 103 counts an address of a consecutive instruction, that is a summation of the value of the program counter 101 and the constant instruction length is generated, and then the summation result is provided to the multiplexer 107. If the direction 106 predicted by the prediction unit 104 is "not taken of the branch instruction", the multiplexer 107 feeds a next consecutive instruction address output from the adder 103 into the program counter 101 where it is used as the address of next fetch instruction, and the process is continuously executed. Otherwise, the multiplexer 107 feeds the target address 105 predicted by the prediction unit 104 into the program counter 101 where it is used as the address of next fetch instruction, namely the instruction subsequent to the current branch instruction is fetched in advance. Under the premise of faultless prediction, regardless of whether the branch is taken or not, the pipeline can fetch an instruction from a correct address every cycle.

Advantages of branch prediction are described in detail with reference to FIG. 2 and 3 hereinafter. FIG. 2 schematically shows how the pipeline having no branch prediction capability executes the instruction. It is assumed that the pipeline includes 5 stages from F1 to W5. At the $4^{th}$ cycle, after the branch instruction BC4 is fetched by the pipeline, since it is not possible to predict the address of the instruction to be executed next, the front end of the pipeline is idle. The instruction is not fetched until the $6^{th}$ cycle, where the instruction BC4 has passed the execution stage E3 and the address of the next instruction T5 is available. As shown in the diagram, after the instruction BC4 is fetched, the pipeline has idled for two cycles in such case.

Compared to FIG. 2, FIG. 3 schematically shows how the pipeline having branch prediction capability executes the instruction. It is assumed that the pipeline also includes 5 stages from F1 to W5. At the $4^{th}$ cycle, after the branch instruction BC4 is fetched by the pipeline, meanwhile the address of the next instruction T5 had been predicted, thus the instruction T5 is directly fetched by the pipeline at the $5^{th}$ cycle. At the $6^{th}$ cycle, when the instruction BC4 has passed the execution stage E3 and it is verified that the address for the next instruction is correctly predicted, the front end result of the pipeline is reserved and subsequent instructions can continue their execution. Therefore, no idle stage exist in the pipeline, and a maximum efficiency is achieved in such case.

The example shown in FIG. 3 assumes that only one cycle is required for branch prediction. However, along with the complicated mechanism of the continuously developed branch prediction, new issue arises. As shown in FIG. 4, it is assumed that the pipeline includes 7 stages from F1 to W7, and it takes two cycles to predict the branch target address. At the $4^{th}$ cycle, when the branch instruction BC4 enters into F1 stage, meanwhile the prediction unit starts to predict the target address of the branch instruction BC4. Since two cycles are required for the prediction, the pipeline is unable to obtain the predicted target address of BC4 at the beginning of the $5^{th}$ cycle, therefore the sequential instruction i5 is fetched. The pipeline will be unaware that the target address of BC4 is T9 until the $5^{th}$ cycle has been totally completed, and T9 is fetched only when the $6^{th}$ cycle begins. Therefore, the cycles spent in fetching the instruction i5 previously are wasted in such an ineffective method.

U.S. Pat. No. 6,622,240 discloses a method for resolving the problems mentioned above. In this method, the calculation required to obtain the target address of the branch instruction is copied first, and the copied version of the calculation is provided to the pipeline as a pre-branch instruction, such that the pre-branch instruction can be processed by the pipeline in advance. After the pipeline has completed its fetching of the branch instruction, the calculation of the pre-branch instruction is also completed. Meanwhile, the target address of the branch instruction is available, and the instruction on the target address can be fetched when next cycle is just started. In this method, after the branch instruction is fetched, there is no idle stage in the pipeline. However, at least one cycle is required for the pipeline to process the derived pre-branch instruction before it is fetched, thus there is still some wasting of useful resources.

It is known from description above, a new method is demanded in order to further reduce idle and waste of the pipeline which needs more than one cycle to predict its branch target address.

SUMMARY OF THE INVENTION

Therefore, the present invention is directed to a method of predicting branch instructions and a method of skipping branch instruction for pipelines which need more than one cycle to predict branch target addresses, such that the idle stages in the pipeline can be reduced to a minimum level.

The present invention is directed to a method of predicting branch instructions. First, a prediction unit is provided. Next, a current instruction is fetched, wherein if the current instruction is a branch instruction, the address of a previously executed precedent instruction is used as an index to record a related information required for predicting into the prediction unit. Next, the address of the precedent instruction mentioned above is used as index for prediction unit to search the corresponding related information, so as to predict the outcome (the direction and the target address) of the branch instruction. Finally, if the corresponding related information exists in the prediction unit and the branch is predicted taken, the predicted target address of the branch instruction is used as the PC to fetch the next instruction; otherwise, the address of the sequential instruction is used as the PC to fetch the next instruction.

In accordance with an embodiment of the present invention, the prediction method uses the address of the precedent instruction which is executed right before the branch instruction as index rather than using the address of the branch instruction as index like the prior art. Therefore, the prediction is started before the branch instruction is fetched. With the accurate arrangement of time difference, the pipeline can complete the prediction of the branch outcome just when the pipeline completes fetching the branch instruction, such that in the next cycle the pipeline can fetch the branch target if the branch is taken, or the sequential instruction if the branch is not taken. Under the premise of faultless prediction, the prediction method can effectively reduce the idle stages in the pipeline.

If the real address of the instruction right after the branch instruction is not equal to the previously predicted address, a branch misprediction is signaled and all instructions in the pipeline fetched after the branch instruction must be killed. The pipeline resumes by fetching a new instruction from the real address of the next instruction after the branch instruction. This step is called branch prediction verification.

The present invention is directed to a method of skipping branch instructions. First, a prediction unit is provided. Next, a current instruction is fetched, wherein if the current instruction is an unconditional fixed-target branch instruction and an instruction executed before the current instruction is not a branch instruction, the address of the $n^{th}$ previously executed instruction before the current instruction is used as index to record a related information required for the prediction into the prediction unit, wherein n is a number of cycles required by the prediction unit from receiving the index address to the completion of predicting the branch target address. Next, the address of the $n^{th}$ previously executed instruction before the current instruction is used as index for the prediction unit to search the corresponding related information so as to predict the outcome of the branch instruction. Finally, if the corresponding related information exists in the prediction unit and the branch is predicted taken, the target address of the branch instruction is used as the next PC; otherwise, the address of the sequential instruction is used as the next PC.

In accordance with an embodiment of the present invention, the skipping method uses the address of the instruction which is executed before the branch instruction as index rather than using the address of the branch instruction as index like the prior art. Therefore, the prediction is started earlier before the branch instruction is fetched. With the accurate arrangement of time difference, the pipeline can complete the prediction of the unconditional branch target address just when the pipeline completes fetching the instruction right before the branch instruction, such that the pipeline can directly fetch the branch target instruction in the next cycle, and the branch instruction is skipped and not executed accordingly. Since the unconditional and fixed target branch instructions are always executed the same way, the skipping is not a prediction, but a guaranteed result such that cycles are saved.

In the case of self-modifying code, when software changes unconditional fixed-target branch instructions into different instructions, software must also invalidate the corresponding entries in the branch prediction unit to guarantee the correct results.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 2 schematically shows an example of executing instructions by a pipeline without branch prediction capability.

FIG. 3 schematically shows an example of executing instructions by a pipeline with 1-cycle branch prediction capability.

FIG. 7 schematically shows an example of executing the method for branch instruction prediction according to an embodiment of the present invention.

FIG. 9 schematically shows an example of executing the method for branch instruction skipping according to an embodiment of the present invention.

DESCRIPTION OF EMBODIMENTS

It is assumed that the pipeline of the present embodiment comprises a prediction unit, and it takes n cycles to predict the branch target address. In addition, it is assumed that the pipeline stores the address of the current instruction and the addresses of all n previously executed instructions, that is, the current address contents of the program counter and all n previous address contents. In the present embodiment, PC[0] represents the address of the current instruction, PC[-1] represents the address of the previous instruction, and PC[-2] represents the address of the $2^{nd}$ previous instruction, . . . , and PC[-n] represents the address of the $n^{th}$ previous instruction.

Figure 1:
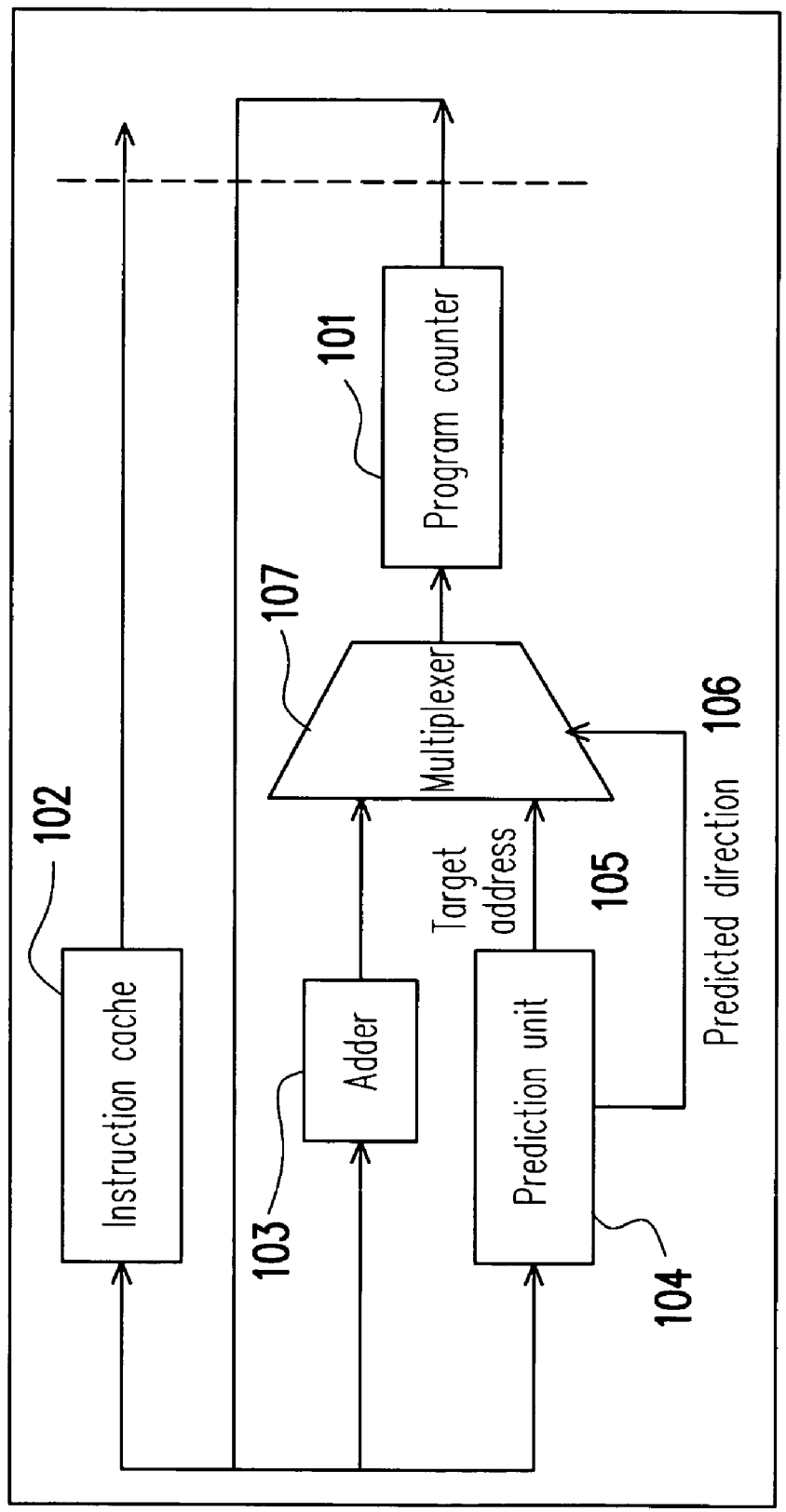
FIG. 1 is a configuration diagram of a conventional branch prediction technique.
Figures 4, 5:
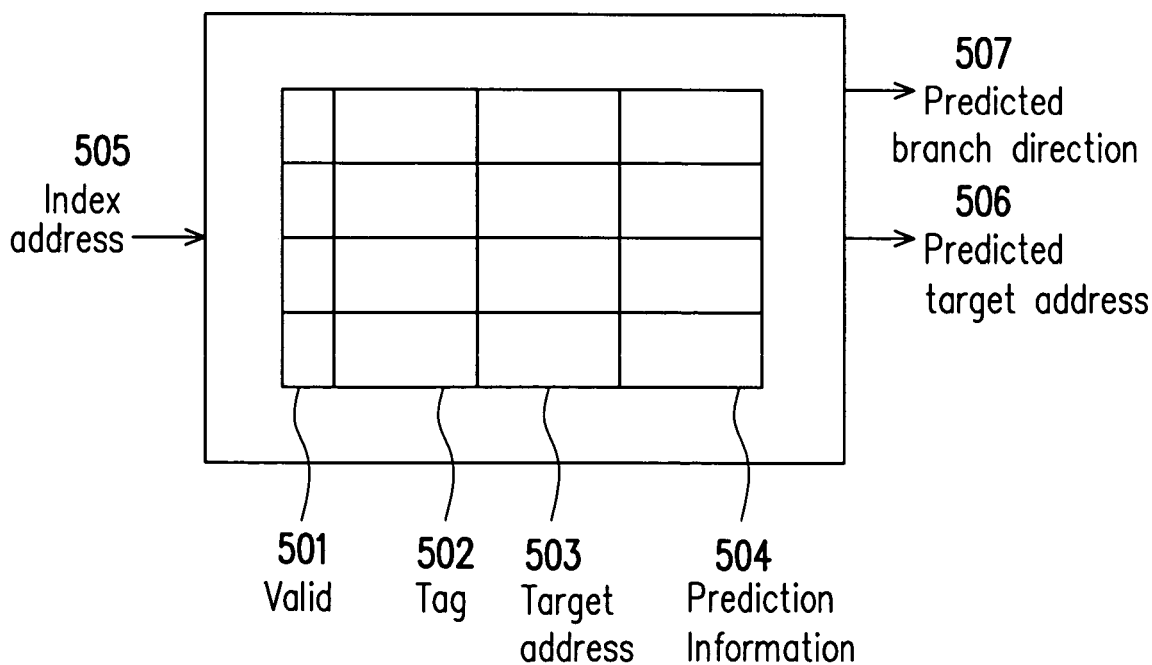
FIG. 4 schematically shows an example of executing instructions by a pipeline with 2-cycle branch prediction capability, but without the present invention.
FIG. 5 schematically shows a branch instruction prediction unit according to an embodiment of the present invention.

FIG. 5 schematically shows a prediction unit used in the present embodiment, and the prediction unit is mainly composed of a table. Even though only 4 rows are shown in FIG. 5, in fact, there can be any number of rows in the table. The contents in each row corresponds to a related information of the branch instruction, and each row is referred to as a record of data. There are four fields in the table: a first field 501, which stores a valid flag for indicating whether the contents stored in this row is valid or not; a second field 502, which stores the address of the nth previous instruction before the corresponding unconditional fixed-target branch instruction or the address of the n-$1^{th}$ previous instruction before any other branch; a third field 503, which stores the prediction target address; and a fourth field 504, which stores the prediction information. The prediction unit receives an index address 505, searches for the corresponding record in the table, and provides a predicted target address 506 and a predicted direction 507. 506 connects to 105 and 507 connects to 106. The usage of the table mentioned above is described in detail later. Note that there are many ways to record prediction information and use it to do prediction. All can be used here to predict the branch direction as taken or not taken.

The structure of the prediction unit used in the present embodiment is not complicated, and related information it stores is quite simple. As a matter of fact, the prediction unit is capable of storing more prediction information and providing more accurate prediction results. Generally, the more complicated the algorithm of the branch direction prediction, the more related information it requires.

Figure 6:
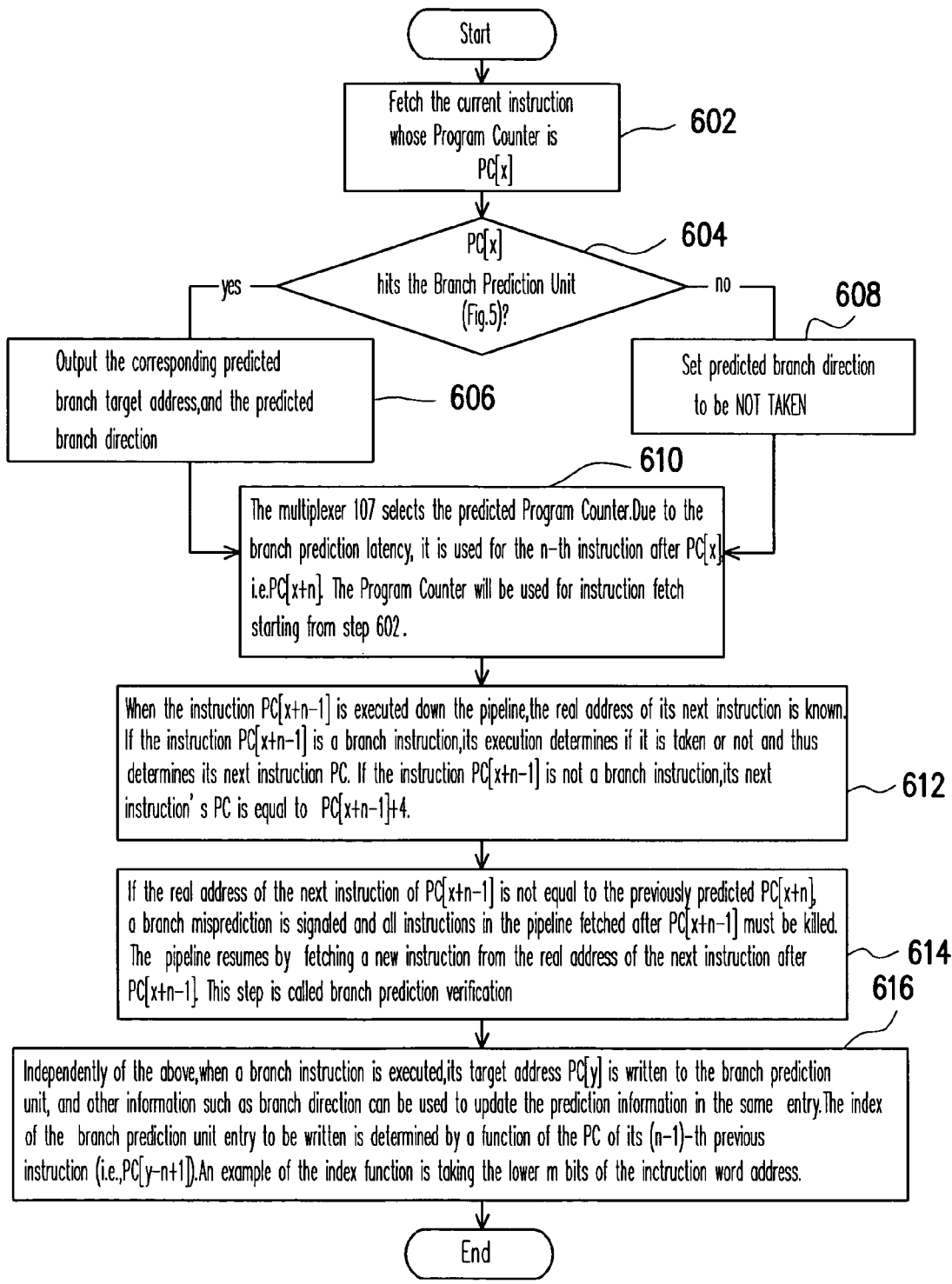
FIG. 6 is a flow chart illustrating a method for branch instruction prediction according to an embodiment of the present invention.

A method for branch instruction prediction provided by the present invention is described in detail with reference to steps and flows shown in FIG. 6 hereinafter. At first, step 602 fetches the current instruction whose Program Counter is PC[x]. Next, at step 604, it is determined whether or not PC[x] hits the Branch Prediction Unit (FIG. 5). If it is, the process proceeds to step 606, which outputs the corresponding predicted branch target address 506, and the predicted branch direction 507, otherwise, the process proceeds to step 608, which sets predicted branch direction 507 to be NOT TAKEN.

After steps 606 and 608, at step 610, the multiplexer 107 selects the predicted Program Counter. Due to the branch prediction latency, it is used for the n-th instruction after PC[x], i.e. PC[x+n].

Next, at step 612, when the instruction PC[x+n-1] is executed down the pipeline, the real address of its next instruction is known. If the instruction PC[x+n-1] is a branch instruction, its execution determines if it is taken or not and thus determines its next instruction PC. If the instruction PC[x+n-1] is not a branch instruction, its next instruction's PC is equal to PC[x+n-1]+4.

Next, at step 614, if the real address of the next instruction of PC[x+n-1] is not equal to the previously predicted PC[x+n], a branch misprediction is signaled and all instructions in the pipeline fetched after PC[x+n-1] must be killed. The pipeline resumes by fetching a new instruction from the real address of the next instruction after PC[x+n-1]. This step is called branch prediction verification.

Finally, at step 616, independently of the above, when a branch instruction is executed, its target address PC[y] is written to the branch prediction unit, and other information such as branch direction can be used to update the prediction information 504 in the same entry. The index of the branch prediction unit entry to be written is determined by a function of the PC of its (n-1)-th previous instruction (i.e., PC[y-n+1]). An example of the index function is taking the lower m bits of an instruction word address.

The effects of this prediction method are described here. Referring to FIG. 7, it is assumed that the prediction unit of an embodiment requires two cycles to predict the branch target address, and there are 7 stages from F1 to W7 in the pipeline of this embodiment. As shown in the diagram, the precedent instruction of the branch instruction BC4 is i3. At the $3^{rd}$ cycle, the pipeline starts to fetch i3 and predict the target address of BC4. At the $4^{th}$ cycle, the pipeline completes fetching of BC4, the predicted target address T9 of BC4 is also available. Then, at the $5^{th}$ cycle, the pipeline can fetch T9 directly. Accordingly, under the premise of faultless prediction, the method for branch instruction prediction provided by the present invention effectively reduces idle stages in the pipeline and provides a maximum efficiency for the pipeline.

Figure 8:
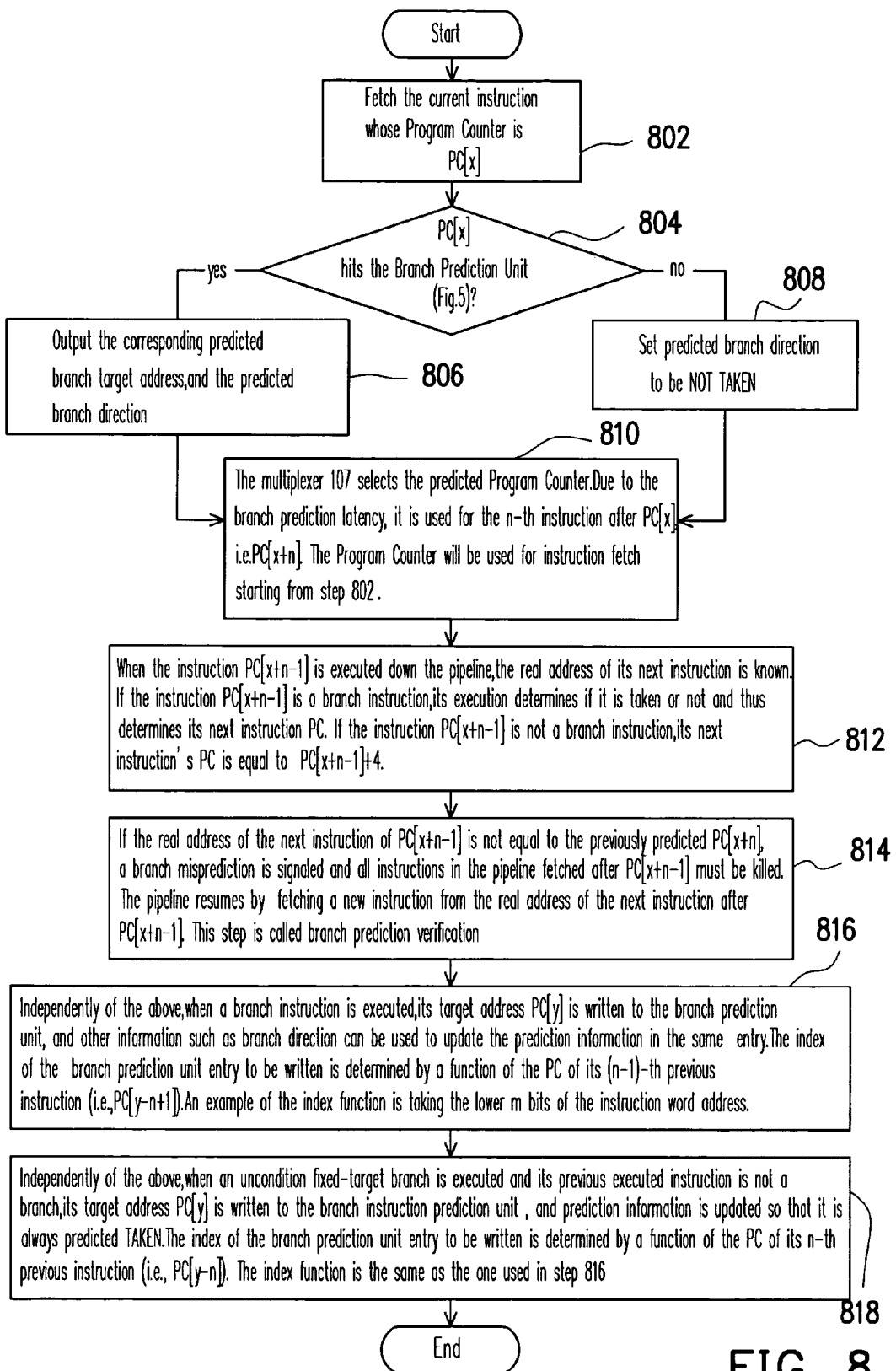
FIG. 8 is a flow chart illustrating a method for branch instruction skipping according to an embodiment of the present invention.

A method of skipping branch instruction is derived from the method for branch instruction prediction provided by the present invention. The skipping method is used to skip some specific branch instructions and further to save cycles of the pipeline. The method of skipping branch instruction is described in detail with reference to steps and flows shown in FIG. 8.

The method of skipping branch instruction is similar to the method for branch instruction prediction mentioned above. Steps 802 to 816 are the same as steps 602 to 616. And finally, at step 818, independently of the above, when an unconditional branch is executed and its previous executed instruction is not a branch, its target address PC[y] is written to the branch instruction prediction unit, and prediction information 504 is updated so that it is always predicted TAKEN. The index of the branch instruction prediction unit entry to be written is determined by a function of the PC of its n-th previous instruction (i.e., PC[y-n]). The index function is the same as the one used in step 816.

Therefore, when the pipeline completes fetching a previous instruction before the branch instructions, the prediction of the target address of the branch instruction is also completed. Accordingly, the pipeline can directly fetch the instruction on the target address at next cycle. Since the branch instructions are skipped and not executed, compared to other branch instructions, one more cycle is saved accordingly.

FIG. 9 is a schematic diagram illustrating the effects of the method of skipping branch instruction. It is assumed that the prediction unit of an embodiment requires two cycles to predict the branch target address, and there are 7 stages from F1 to W7 in the pipeline of this embodiment. As shown in the diagram, the precedent instruction of the branch instruction B4 is i2. At the $2^{nd}$ cycle, the pipeline starts to fetch i2 and predict the target address of B4. Then, after the $3^{rd}$ cycle is completed, while the pipeline completes fetching of i3, the target address T9 of B4 is also predicted. Then, the pipeline directly fetches T9 by skipping B4. The line indicated by underline mark in FIG. 9 does not happen physically, and B4 does not enter into the pipeline and does not consume any cycles, thus the cycles it saves can be used for executing other instructions.

In order to avoid the fault skipping of the unconditional fixed-target branch instructions due to the self-modified code, the branch instruction record included in the branch prediction unit must be consistent to the branch instruction stored in the memory. If the contents of the memory is changed and one or more unconditional branch instructions are removed as a result, the related record corresponding to the branch instructions must be removed from the prediction unit. The later-rebuilt record is guaranteed to be consistent with the newest branch instructions residing in the memory.

In summary, the major characteristic and advantage of the present invention is: by using the address of the previously executed precedent instruction as index for prediction, the prediction can be started earlier. Accordingly, the predicted target address of the branch instruction is obtained earlier, and the idle stages in pipeline can be removed.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method of predicting branch instruction, comprising:
fetching and executing a current instruction;
wherein if the current instruction is a branch instruction, an address of a previously executed precedent instruction at a relative offset is used as an index to record a related information required for prediction of the branch instruction, the relative offset in the execution sequence between the precedent instruction and the current instruction is determined based on the type of the current instruction so as to reduce idle cycles;
using the address of the precedent instruction as an index for a prediction unit to search the related information so as to predict the target address of the branch instruction; and
wherein if the related information exists and the predicted direction is taken, the predicted target address of the branch instruction is used to fetch the next instruction; otherwise, an address of the sequential instruction is used to fetch the next instruction.

2. The method of predicting branch instruction of claim 1, further comprising:
recording the address of the current instruction and the addresses of all a previously executed instructions, wherein n is a number of cycles required for a time period from receiving the address of the precedent instruction as an index to the completion of predicting the branch direction and the target address of the branch instruction, the address of the precedent instruction is one of the recorded address of all n previously executed instructions.

3. The method of predicting branch instruction of claim 2, wherein the address of the precedent instruction is an address of an n-th previously executed instruction before the current instruction if the current instruction is an unconditional fixed-target branch instruction and a previous instruction immediately before the current instruction is not a branch instruction, otherwise the address of the precedent instruction is an address of an (n−1)-th previously executed instruction before the current instruction.

4. The method of predicting branch instruction of claim 1, wherein the related information comprises a direction of the branch instruction.

5. The method of predicting branch instruction of claim 1, wherein the related information comprises the target address of the branch instruction.

6. The method of predicting branch instruction of claim 1, wherein the related information is stored in a table of a branch prediction unit.

7. The method of predicting branch instruction of claim 1, further comprising:
providing a memory space to instructions;
fetching the current instruction from the memory; and
removing the related information corresponding to unconditional fixed-target branch instructions in the branch prediction unit if the contents of the memory is changed and those branch instructions are removed as a result.

* * * * *